United States Patent [19]

Wu

[11] Patent Number: 5,908,358
[45] Date of Patent: Jun. 1, 1999

[54] URETHANE GOLF BALL COVERS USING EPOXY COMPOUNDS WITH A POLYAMINE OR GLYCOL AS CURING AGENTS

[75] Inventor: Shenshen Wu, North Dartmouth, Mass.

[73] Assignee: Acushnet Company, Fairhaven, Mass.

[21] Appl. No.: 08/962,699

[22] Filed: Nov. 3, 1997

Related U.S. Application Data

[63] Continuation of application No. 08/482,524, Jun. 7, 1995, abandoned.

[51] Int. Cl.$^6$ .............................. A63B 37/12; C08L 75/04; C08L 75/08
[52] U.S. Cl. .......................... 473/378; 473/361; 473/365; 525/454
[58] Field of Search .............................. 525/454; 473/361, 473/365, 378

[56] References Cited

U.S. PATENT DOCUMENTS

| | | | |
|---|---|---|---|
| 3,147,324 | 9/1964 | Ward | 264/254 |
| 3,979,126 | 9/1976 | Dusbiber | 524/297 |
| 4,123,061 | 10/1978 | Dusbiber . | |
| 4,588,420 | 5/1986 | Charvat | 523/139 |
| 4,870,142 | 9/1989 | Czerwinski et al. . | |
| 5,150,906 | 9/1992 | Molitor et al. | 273/220 |
| 5,334,673 | 8/1994 | Wu . | |
| 5,409,233 | 4/1995 | Kennedy | 273/235 A |

*Primary Examiner*—Robert E. Sellers
*Attorney, Agent, or Firm*—Pennie & Edmonds LLP

[57] ABSTRACT

A golf ball cover is produced from a composition comprising an isocyanate-functional prepolymer and a curing agent of a polyamine or glycol, and an organic compound having at least one epoxy group such as the diglycidyl ether of bisphenol A.

36 Claims, No Drawings

URETHANE GOLF BALL COVERS USING EPOXY COMPOUNDS WITH A POLYAMINE OR GLYCOL AS CURING AGENTS

CROSS-REFERENCE TO RELATED APPLICATION

This application is a continuation of application Ser. No. 08/482,524, filed Jun. 7, 1995, now abandoned.

BACKGROUND OF THE INVENTION

1. Field of the Invention

This invention relates to polyurethane golf ball covers which use an epoxy curing agent, in particular, (2,2-bis[4-(2'3' epoxy propoxy) phenyl] propane). Golf ball covers employing the curing agents of the present invention have an improved shear resistance.

2. Description of the Prior Art

Polyurethane has been recognized as a useful material for golf ball covers since as early as about 1960. U.S. Pat. No. 3,147,324, filed Oct. 20, 1960, is directed to a method of making a golf ball having a polyurethane cover. This patent disclosed an improved method of covering a golf ball with a liquid urethane polymer which could be applied, set and cured at room temperature or at a temperature that would not damage the tensioned windings of the golf ball center. The curing agents disclosed were diamines, polyols or air moisture. However, the '324 patent does not teach the use of epoxy or diol curing agents and did not recognize the existence of shear resistance problems engendered in polyurethane golf balls which have been cured with diol curing agents.

Even though no commercial golf ball was introduced to the market until recently, various companies continued to investigate polyurethane as a golf ball cover material in limited ways. U.S. Pat. No. 4,123,061 issued Oct. 31, 1978 teaches that a golf ball can be made from a polyurethane prepolymer of polyether and a curing agent, such as a trifunctional polyol, a tetrafunctional polyol or a diamine. However, this patent does not recognize the fact that golf ball covers comprising polyurethane and a polyol curing agent exhibit reduced shear resistance. There is also no teaching in the '061 patent that the addition of an organic curing agent having at least one epoxy group to the polyurethane golf ball cover material will improve the product's properties in any respect.

Shear resistance is a golf ball's ability to withstand the shear force applied to a ball when hit with a golf club and/or iron. When the biting grooves on the striking surface of a golf club and/or iron impact a golf ball in a downward oblique swing causing it to be slidingly uplifted across, and immediately forcibly propelled in an outbound trajectory from, the particular club face, the shear force applied to the golf ball cover often produces cuts or abrasion marks on the surface of the cover material of the golf ball. Acushnet Company, which has been the industry leader in the research and development of polyurethane covered golf balls for twenty years, has only now unexpectedly found that polyurethane golf ball covers which incorporate an epoxy curing agent have significantly improved shear resistance.

Polyurethanes having an epoxy resin bound in their structure were known in the art, but not in the art of manufacturing golf ball covers. In particular, U.S. Pat. No. 4,870,142 to Czerwinski discloses polyurethane compositions which are produced from a polyisocyanate, a polyhydroxyl compound, a chain extender and an epoxy resin. The Czerwinski patent not only does not teach the use of polyurethane compositions in golf ball covers, but also does not disclose the problems of inadequate shear resistance that the present invention has now solved.

Despite the fact that it had been known for over thirty years that polyurethane compositions were useful in formulating golf ball covers, no commercially successful polyurethane covered golf ball appeared on the market until the introduction of Titleist's PROFESSIONAL brand golf ball in 1993. Although the cost of the raw materials needed to produce polyurethane composition golf ball covers was an inhibiting factor in bringing such golf balls on the market, the principal obstacle lay in the extraordinary difficulty in efficaciously applying a coating of polyurethane composition to a golf ball core to form a golf ball cover having a uniform thickness, i.e., a golf ball having a uniform difference between the inner and outer diameter of its cover.

In particular, the difficulty resided in centering a golf ball core in an amount of polyurethane that was sufficiently cured to keep the core centered while at the same time being insufficiently cured so that the cover material could be molded around the core. This problem was essentially solved and a commercially successful polyurethane covered golf ball appeared on the market with the introduction of the aforesaid PROFESSIONAL brand polyurethane covered golf ball in 1993. Ongoing research and development into different polyurethane compositions for golf ball covers has led to the present invention in which a golf ball core clad with a polyurethane composition cover which has been set with an epoxy curing agent is virtually free of abrading marks and damage to the cover when struck with a golf club.

SUMMARY OF THE INVENTION

This invention is directed to novel polyurethane golf ball covers using an epoxy curing agent.

This invention is further directed to a golf ball comprising a cover and a core wherein the cover is made from a thermosetting or thermoplastic polyurethane composition comprising an isocyanate-functional polyurethane prepolymer and a curing agent comprising a polyamine or glycol, and an organic compound having at least one epoxy group and wherein the Young's modulus of the cover is in the range of from 10,000 psi to 90,000 psi.

This invention is also directed to a method of curing polyurethane in a golf ball cover with an organic curing agent having at least one epoxy group.

DETAILED DESCRIPTION OF THE INVENTION

Epoxy resins contain a reactive oxirane moiety having the following structure:

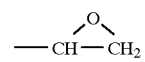

which is commonly referred to as an "epoxy" functionality. Liquid epoxy resins are converted through these reactive epoxy sites into tough, insoluble, and infusible solids.

The curing agents of the present invention are organic compounds which have an epoxy group and are capable of curing polyurethane for use in golf ball covers. Curing agents according to the present invention have the general formula:

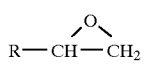

Formula I wherein R is an organic group selected from the group consisting of linear or branched chain alkyl, carbocyclic or aryl groups.

As used herein, the phrase linear chain or branched chain alkyl groups of up to about 30 carbon atoms means any substituted or unsubstituted acyclic carbon-containing groups, including alkyl, alkenyl and alkynyl groups. Examples of alkyl groups include lower alkyl, for example, methyl, ethyl, n-propyl, iso-propyl, n-butyl, iso-butyl or tert-butyl; upper alkyl, for example, octyl, nonyl, decyl, and the like; and lower alkenyl, for example, ethenyl, propenyl, propadrenyl, butenyl, butadienyl, and the like. The ordinary skilled artisan is familiar with numerous linear and branched alkyl groups, which are within the scope of the present invention.

In addition, such alkyl group may also contain various substituents in which one or more hydrogen atoms has been replaced by a functional group. Functional groups include but are not limited to hydroxy, amino, carboxy, amide, ester, ether, halogen (fluorine, chlorine, bromine and iodine), siloxanyl and sulfonyl amides to mention but a few.

As used herein, substituted and unsubstituted carbocyclic groups of up to about 20 carbon atoms means cyclic carbon-containing compounds, including but not limited to cyclopentyl, cyclohexyl, cycloheptyl, admantyl, and the like. Such cyclic groups may also contain various substituents in which one or more hydrogen atoms has been replaced by a functional group. Such functional groups include those described above, and lower alkyl groups as described above. The cyclic groups of the invention may further comprise a heteroatom.

As used herein, substituted and unsubstituted aryl groups means a hydrocarbon ring bearing a system of conjugated double bonds, usually comprising six or more even number of π (pi) electrons. Examples of aryl groups include, but are not limited to, phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can be nitro groups.

As mentioned above, R can also represent any combination of alkyl, carbocyclic or aryl groups, for example, 1-cyclohexylpropyl, benzyl, cyclohexylmethyl, 2-cyclohexylpropyl, 2,2-methylcyclohexylpropyl, 2,2-methylphenylpropyl, 2,2-methylphyenylbutyl.

A more preferred class of curing agents for the present invention is organic compounds having two epoxy groups as shown in formula II:

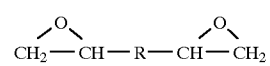

Formula II wherein R is defined as above.

The most preferred diepoxy curing compound for use in the present invention is 2,2-bis[4-(2',3'-epoxypropoxy)phenyl]propane, commonly called the diglycidyl ether of bisphenol A (DGEBA) and having formula III:

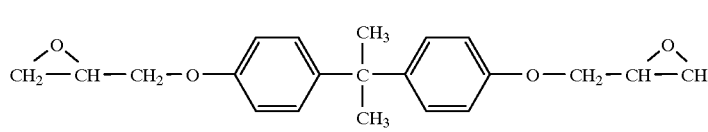

Formula III

Other curing agents, related to DGEBA may also be used in the present invention. The higher molecular weight homologs are represented by the following theoretical structure having formula IV:

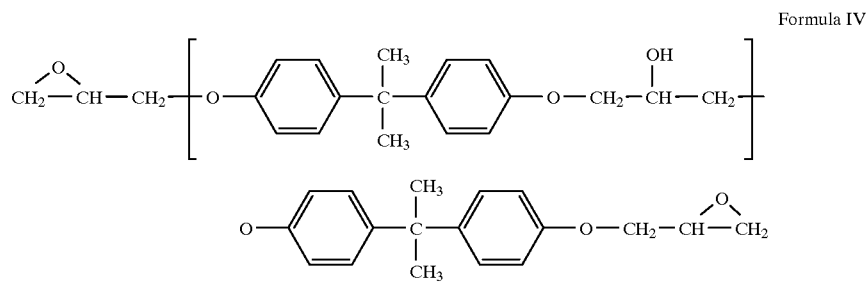

Formula IV

Typical value of "n" can be from 0.5 to about 2.5 and is about 0.15 for D.E.R. 331 epoxy resin (epoxy equivalent weight range of 182–192 and viscosity of 11,000–14,000 cps). The low melting point solid resins begin at an "n" of about 2.5. In high melting point solid resins, "n" may be as high as 18.

With increasing molecular weight, i.e. as n gets larger, another reactive site—the OH group—is introduced. This group can react at higher temperatures with anhydrides, organic acids, amino resins, and phenolic resins, or with epoxide groups (when catalyzed) to give additional cross-linking.

Other organic compounds having at least one epoxy group which, according to the claimed invention, can be used as curing agents include the epoxy-novolac resins under the trade name D.E.N. (400 series), such as D.E.N. 431, D.E.N. 438 and D.E.N. 439, available from Dow Chemical Co. Further, low viscosity polyglycol epoxy resins under the trade name D.E.R. (700 series), including D.E.R. 732 and D.E.R. 736 may also be used. Also, the EPON™ class of epoxy resin available from SHELL can also be used in the cover compositions according to the present invention.

The amount of curing agent used with the polyurethane in the present golf ball cover is any amount sufficient to cure the polyurethane to a point where said cover will have a Young's modulus of from about 5,000 psi to about 100,000 psi. More preferably, the amount of curing agent can be sufficient to provide the golf ball cover with a Young's modulus of from about 10,000 psi to about 85,000 psi. Still more preferred, the curing agent will be present in an amount to provide a golf ball cover having a Young's modulus of from about 15,000 psi to about 85,000 psi. Most preferably, the curing agent will be present in an amount to provide a golf ball cover having a Young's modulus of from 17,000 to about 30,000 psi. Unless otherwise specified all Young's modulus measurements in the present invention are measured by ASTM method D638–84 wherein the chord technique is used.

The amount of curing agent can alternatively, or separately, be identified as an amount of the diol additive to the urethane prepolymer. The ratio of epoxy curing agent/diol compound can be any which will provide a cover material having a flexural modulus suitable for use on golf balls. Specifically, this range can be 0.01 EQ to about 0.20 EQ of epoxy group per EQ of hydroxy group. A more preferred range will be from 0.05 EQ to about 0.15 EQ of epoxy group per EQ of hydroxy group or most preferred from about 0.1 EQ to about 0.15 EQ of epoxy group per EQ of hydroxy group.

Polyurethane results from the reaction between a polyurethane prepolymer and a curing agent. The polyurethane prepolymer can be the product of a reaction between a polyol and a diisocyanate. Curing agents such as diamines, glycols and diols can be used to cure polyurethane. A catalyst can be employed to promote the reaction between the curing agent and the polyurethane prepolymer.

Conventionally, there are two categories of polyurethane on the market, thermoset and thermoplastic. Thermoplastic polyurethanes are made from a diisocyanate, such as 4,4'-diphenylmethane diisocyanate (MDI) or 3,3'-dimethyl-4,4'-biphenylene diisocyanate (TODI), and a polyol cured with a diol, such as 1,4-butanediol. Thermoset polyurethanes can be made from a diisocyanate, such as 2,4-toluene diiocyanate (TDI) or methylenebis-(4-cyclohexyl isocyanate) (HMDI), and a polyol which is cured with a polyamine, such as methylenedianiline (MDA), or a trifunctional glycol, such as trimethylol propane, or tetrafunctional glycol, such as N,N,N',N'-tetrakis(2-hydroxypropyl)ethylenediamine.

Suitable polyether polyols include polytetramethylene ether glycol; poly(oxypropylene) glycol; and polybutadiene glycol. Suitable polyester polyols include polyethylene adipate glycol; polyethylene propylene adipate glycol; and polybutylene adipate glycol. Suitable polylactone polyols include diethylene glycol initiated caprolactone; 1,4-butanediol initiated caprolactone; trimethylol propane initiated caprolactone; and neopentyl glycol initiated caprolactone. The preferred polyols are polytetramethylene ether glycol; polyethylene adipate glycol; polybutylene adipate glycol; and diethylene glycol initiated caprolactone.

Suitable curatives for use in the present invention are selected from the slow-reacting polyamine group consisting of 3,5-dimethylthio-2,4-toluenediamine; 3,5-dimethylthio-2,6-toluenediamine; N,N'-dialkyldiamino diphenyl methane; trimethylene-glycol-di-p-aminobenzoate;; polytetramethyleneoxide-di-p-aminobenzoate; or a difunctional glycol; and mixtures thereof. 3,5-dimethylthio-2,4-toluenediamine and 3,5-dimethylthio-2,6-toluenediamine are isomers and are sold under the trade name ETHACURE® 300 by Ethyl Corporation. Trimethylene glycol-di-p-aminobenzoate is sold under the trade name POLACURE 740M and polytetramethyleneoxide-di-p-aminobenzoates are sold under the trade name POLAMINES by Polaroid Corporation. N,N'-dialkyldiamino diphenyl methane is sold under the trade name UNILINK® by UOP.

Suitable bifunctional glycols are 1,4-butanediol; 1,3-butanediol; 2,3-butanediol; 2,3-dimethyl-2,3-butanediol; dipropylene glycol; and ethylene glycol. Difunctional glycols are inherently slow-reacting. In a preferred mode of the present invention, two curing agents will be used in the preparation of the polyurethane, one diol curing agent and one curing agent having at least one epoxy group.

Preferably, a golf ball is made in accordance with the present invention by molding a cover about a core wherein the cover is formed from a polyurethane composition comprising a polyurethane prepolymer and a slow-reacting polyamine curing agent or a bifunctional glycol and an epoxy curing agent.

It has also been found that in order to alleviate the undesirable yellowish color of the polyurethane cover, an effective amount of white pigment and violet agent can be added to the cover composition. Suitable violet agents include PV Fast Violet RL Special and Hostapern Violet RL Extra Strong sold by Hoechst Celanese Corporation; and Violet 23 sold by Sun Chemical Corporation. The amount of violet agent added to the cover composition is preferably about 0.0005% to about 0.002% based on total weight of cover stock. Good results have been obtained with about 0.001% by weight. Preferably, about 3.5% of the white pigment by weight of the total cover composition is used in the cover stock of the present invention.

Ultra marine blue pigments may also be used in the golf ball covers according to the present invention. Preferably the amount of ultra marine blue pigment used will be from about 0.01% to about 1.0% or more preferably from about 0.4% to about 0.8%.

Suitable white pigments include titanium dioxide, calcium carbonate, zinc oxide and zinc sulfide. These white pigments may be used in any amount which is suitable to provide a uniform white color of the desired brightness to the golf ball covers of the present invention. In particular, these white pigments may be used in amounts of from about 0.001% to about 5.0%. The more preferred range of white pigment is from about 0.2% to about 4.0%.

Additional components which can be added to the cover composition include U.V. stabilizers such as Tinuvin 213 and Tinuvin 328, for example. Also, light stabilizers such as, for example, Tinuvin 770 and Tinuvin 765, may also be used. Furthermore, any combination of U.V. stabilizers and light stabilizers can also be used. Other dyes, as well as optical brighteners and fluorescent pigments and antioxidants and antiozonants and dyes may also be used in the golf ball covers according to the present invention. Such additional ingredients may be used in any amounts that will achieve their desired purpose. However conventional amounts include the range of from about 0.05% to about 1.5% or more preferably, from about 0.5% to about 1.0%. Inert fillers such as ZnO, barium sulfide, $TiO_2$, glass and plastic spheres, fibers, glass reinforced fibers, etc. may also be used in the present invention.

The degree of cure of polyurethane compositions which are made in accordance with the present invention is dependent upon, inter alia, the time, temperature, type of curative, and the amount of catalyst used. It has been found that the degree of cure of the cover composition is directly proportional to the hardness of the composition. A hardness of about 10D to about 30D, Shore D hardness, for the cover stock at the end of the intermediate curing step (i.e., just prior to the final molding step) has been found to be suitable for the present invention. More preferred is a hardness of about 12D to about 20D.

Unless otherwise specified, the Shore D hardness is suitably measured with a Shore Durometer made by Shore Instrument and Mfg. Co., Inc. The measurement is made in accordance with ASTM D 2240, "Indentation Hardness of Rubber and Plastic by Means of a Durometer." This test is preformed on a 0.25-inch (6 mm) thick test plaque which has been molded for 5.5 minutes at 140° F. (60° C.) in a test slab mold. The hardness of the plaque is measured after 5.5 minutes and at one minute intervals thereafter up to a total of 30 minutes. The length of time for the intermediate curing step can be determined when the cover stock reaches a hardness between 10D to 30D as measured by the durometer hardness measurement technique. This length of time is suitably found to be 5 to 30 minutes.

The dimpled golf ball product from the final molding step can be subjected to standard golf ball finishing operations such as buffing, painting, nameplating and packaging according to techniques and practices well known in the art.

The golf ball cover materials of the present invention can be employed in any type of golf ball construction such as the conventional two-piece and three-piece (wound) golf balls which are well known in the golf ball art. Likewise, the present golf ball cover materials can also be used in multi-layer golf ball constructions wherein the golf ball comprises of multiple core layers, multiple intermediate or mantle layers, multiple cover layers or combinations thereof. Some specific examples of such multilayer golf balls and methods of manufacturing such balls can be found in the following U.S. patent applications: MULTILAYER GOLF BALL, filed Jun. 7, 1995 by Cavallaro et al., and METHOD FOR MAKING A MULTILAYER GOLF BALL, filed Jun. 7, 1995 by Boehm et al.

These and other aspects of the present invention may be further understood with reference to the following examples.

EXAMPLES

The golf ball cover materials of the present invention can be synthesized by many routes. It is well known in the art of organic synthesis that many different synthetic protocols can be used to prepare a given compound. Different routes can involve more or less expensive reagents, easier or more difficult separation or purification procedures, straightforward or cumbersome scale-up, and higher or lower yield. The skilled synthetic organic chemist knows well how to balance the competing characteristics of synthetic strategies. Thus the compounds of the present invention are not limited by the choice of synthetic strategy, and any synthetic strategy that yields the golf ball cover materials described above can be used.

Example 1

323.85 grams of Airthane QE-130, 28.50 grams of DER-331 Epoxy resin, 36.00 grams of 1,4-butanediol and 13.59 grams of HCC-15181 Color dispersion were weighed and degassed. The DER-331 epoxy resin was added to the Airthane QE-130 and the mixture was hand blended for two minutes. The 1, 4-butanediol was added to this mixture and the materials were further blended for 4 minutes. A portion of the final mixture was added to a male mold cavity maintained at 175° F. and to a female mold cavity maintained at 140° F. At gel, a 1.580" wound core was placed into the male mold and such placement was immediately followed by mating the male mold cavity with the female mold cavity. The assembled mold was clamped into a 4-mold clamping fixture. After an hour cure time at ambient temperature, the finished golf ball was demolded. The physical characteristics and the shear resistance of balls so made were tested and are set forth below in Table 1.

Example 2

376.57 grams of Vibrathane CFM-4-147, 28.50 grams of DER-331 Epoxy resin, 36.00 grams of 1,4-butanediol and 15.44 grams of HCC-15181 Color dispersion were weighed and degassed. The DER-331 epoxy resin was added to the Vibrathane CMF-4-147 and the mixture was hand blended for two minutes. The 1, 4-butanediol was added to this mixture and the materials were further blended for 4 minutes. A portion of the final mixture was added to a male cavity maintained at 175° F. and to a female mold cavity maintained at 140° F. At gel, a 1.580" wound core was placed into the male mold and this step was immediately followed by mating the male mold cavity with the female mold cavity. The assembled mold was clamped into a 4-mold clamping fixture. After an hour cure time at ambient temperature, the finished golf ball was demolded. The physical characteristics and the shear resistance of balls so made were tested and are set forth below in Table 1.

Example 3

376.57 grams of Vibrathane CFM-4-147, 42.75 grams of 1,4 butanediol and 14.68 grams of HCC-15181 Color dispersion were weighed and degassed. The 1, 4-butanediol was added to the Vibrathane CFM-4-147 and the materials were blended for 4 minutes. A portion of the final mixture was added to a male cavity maintained at 175° F. and to a female mold cavity maintained at 140° F. At gel, a 1.580" wound core was placed into the male mold which was immediately followed by mating the male mold cavity with the female mold cavity. The assembled mold was clamped into a 4-mold clamping fixture. After an hour cure time at ambient temperature the finished golf ball was demolded. The shear resistance of balls so made were tested and are set forth below in table 1.

TABLE 1

| | Finished Ball | Size, Inches | | Compression | Initial Velocity | Spin Rate, RPM | | | Cover |
|---|---|---|---|---|---|---|---|---|---|
| | Grams | NP | EQ | PGA | Ft/Sec | Driver | 5-Iron | 8-Iron | Hardness D |
| Professional | 45.33 | 1.680 | 1.683 | 92 | 251.26 | 3855 | — | 8566 | 59 |
| Tour Balata | 45.28 | 1.681 | 1.682 | 85 | 251.77 | 4078 | — | 8846 | 50 |
| Ex1-NT | 45.61 | 1.683 | 1.683 | 88 | 250.41 | 3590 | — | 8174 | 58 |
| EX1-UB | 45.36 | 1.686 | 1.685 | 93 | 251.78 | 3996 | — | 8762 | 58 |
| Ex2-NT | 45.35 | 1.685 | 1.684 | 90 | 253.88 | 4124 | — | 8999 | 51 |
| Ex2-UB | 45.19 | 1.684 | 1.685 | 89 | 253.53 | 4409 | — | 9346 | 51 |

NT - Thin wall center wound with 0.020" thread to 1.580" with a 12 second tension delay.
UB - 384 Tour center wound with a 0.20" thread to 1.580" with a 2.5 second tension delay.

| SHEAR RESISTANCE | | |
| --- | --- | --- |
| BALL | PAINT | COVER |
| Tour Balata | 6 | 6 |
| Professional | 2 | 2 |
| Ex 3 | 7 | 7 |
| Ex 1 - NT | 6 | 1 |
| Ex 1 - UB | 6 | 1 |
| Ex 2 - NT | 6 | 1 |
| Ex 2 - UB | 6 | 1 |

As shown in the table above, entitled "Shear Resistance", a golf ball made according to the present invention using an organic curing agent having at least one epoxy group has a shear resistance rating of 1. Golf balls molded according to Example 3 do not employ an epoxy curing agent according to the present invention and show a shear resistance rating of 7. As indicated in the following table entitled "SHEAR TEST RATING" a 1 is the highest and best rating a golf ball cover can have.

| SHEAR TEST RATING: | | | |
| --- | --- | --- | --- |
| PAINT | | COVER | |
| DESCRIPTION, | RATING | DESCRIPTION, | RATING |
| NO MARKS, NO DAMAGE | 1 | NO MARKS, NO DAMAGE | 1 |
| MARKED, PAINT UNBROKEN | 2 | MARKED, NO CUT SLIGHT CUT, NO MATERIAL MISSING | 2 3 |
| FINE CRACKS, SLIGHT WRINKLES | 3 | MODERATE CUT, NO MATERIAL MISSING | 4 |
| MODERATE CRACKS & WRINKLES | 4 | DEEP CUT, NO MATERIAL MISSING | 5 |
| PAINT PEEL, NO PAINT MISSING | 5 | COVER CUTS & PEELS, NO MATERIAL MISSING | 6 |
| PAINT PEELS, SMALL CHIPS MISSING | 6 | | |
| PAINT PEELS, LARGE AMOUNT MISSING | 7 | COVER PEELS, MATERIAL MISSING | 7 |

Cold cracking resistance for golf balls made according to Examples 1 and Example 2 conducted at 4° F. is comparable to that of the Tour Balata and the Professional with none cracked after 15 hits.

All patents, patent applications and publications described above are herein specifically incorporated by reference in their entirety.

It will be understood that the claims are intended to cover all changes and modifications of the preferred embodiments of the invention herein chosen for the purpose of illustration which do not constitute a departure from the spirit and scope of the invention.

What is claimed is:

1. A golf ball having improved shear resistance comprising a cover and a core wherein the cover is made from a thermoset or thermoplastic polyurethane composition comprising an isocyanate-function polyurethane prepolymer and a curing agent comprising a polyamine or glycol, and an organic compound having at least one epoxy group and wherein the Young's modulus of the cover is from about 5,000 psi to about 100,000 psi.

2. A golf ball according to claim 1 wherein the polyurethane used is castable.

3. A golf ball according to claim 1 wherein the polyurethane is a thermoset.

4. A golf ball according to claim 1 wherein the organic compound having at least one epoxy group has two epoxy groups.

5. A golf ball according to claim 1 wherein the organic compound having at least one epoxy group has one epoxy group.

6. A golf ball according to claim 1 wherein the Young's modulus of the cover is from about 10,000 psi to about 85,000 psi.

7. A golf ball according to claim 1 wherein the Young's modulus of the cover is from about 15,000 psi to about 85,000 psi.

8. A golf ball according to claim 1 wherein the Young's modulus of the cover is from about 20,000 psi to about 75,000 psi.

9. A golf ball according to claim 1 wherein the organic compound having at least one epoxy group has the formula:

Formula I

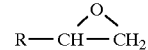

wherein R is alkyl, carbocyclic or aryl.

10. A golf ball according to claim 1 wherein the organic compound having at least one epoxy group has the formula:

Formula II

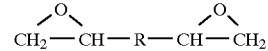

and wherein R is alkyl, carbocyclic or aryl.

11. A golf ball according to claim 1 wherein the organic compound having at least one epoxy group has the formula:

Formula III

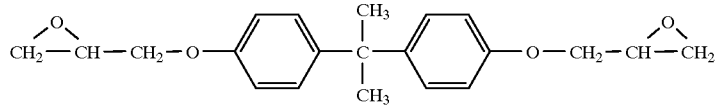

12. A method of improving the shear resistance of an unpainted golf ball having a polyurethane cover comprising the step of adding a curing agent comprising a polyamine or glycol, and an organic compound having at least one epoxy group to an isocyanate-functional polyurethane prepolymer.

13. A method of improving the shear resistance of an unpainted polyurethane covered golf ball according to claim 12 wherein the organic compound having at least one epoxy group has two epoxy groups.

14. A method of improving the shear resistance of an unpainted polyurethane covered golf ball according to claim 12 wherein the organic compound having at least one epoxy group has one epoxy group.

15. A method of improving the shear resistance of an polyurethane covered golf ball according to claim 12 wherein the organic compound having at least one epoxy group has the formula:

Formula I

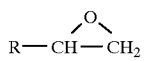

and wherein R is alkyl, carbocyclic or aryl.

16. A method of improving the shear resistance of an unpainted polyurethane covered golf ball according to claim 12 wherein the organic compound having at least one epoxy group has the formula:

Formula II

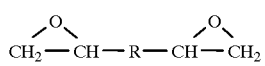

and wherein R is alkyl, carbocyclic or aryl.

17. A method of improving the shear resistance of an unpainted polyurethane covered golf ball according to claim 12 wherein the organic compound having at least one epoxy group has the formula:

Formula III

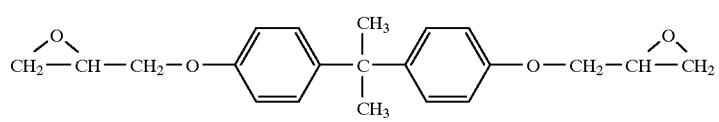

18. The golf ball according to claim 1 wherein the organic compound having at least one epoxy group has the formula:

Formula IV

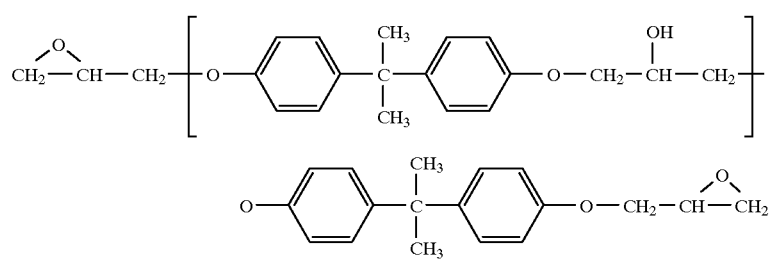

wherein n ranges from 0 to about 2.5.

19. The golf ball according to claim 10 wherein R is a linear chain or branched chain alkyl of up to about 30 carbon atoms.

20. The golf ball according to claim 10 wherein R is selected from the group consisting of methyl, ethyl, n-propyl, iso-propyl, n-butyl, iso-butyl, tert-butyl, octyl, nonyl, decyl, ethenyl, propenyl, propadienyl, butenyl, and butadienyl.

21. The golf ball according to claim 10 wherein R is a substituted alkyl in which one or more hydrogen atom has been replaced by a functional group.

22. The golf ball according to claim 21 wherein the functional groups are selected from the group consisting of hydroxy, amino, carboxy, amide, ester, ether, halogen, siloxanyl and sulfonyl amides.

23. The golf ball according to claim 22 wherein the halogen is selected from the group consisting of fluorine, chlorine, bromine and iodine.

24. The golf ball according to claim 10 wherein R is a carbocyclic of up to 20 carbon atoms.

25. The golf ball according to claim 10 wherein R is selected from the group consisting of cyclopentyl, cyclohexyl, cycloheptyl and admantyl.

26. The golf ball according to claim 10 wherein R is a substituted carbocyclic in which one or more hydrogen atom has been replaced by a functional group.

27. The golf ball according to claim 26 wherein the functional groups are selected from the group consisting of hydroxy, amino, carboxy, amide, ester, ether, halogen, siloxanyl and sulfonyl amides.

28. The golf ball according to claim 10 wherein R is a substituted carbocyclic comprising a heteroatom.

29. The golf ball according to claim 10 wherein R is selected from the group consisting of phenyl, naphthyl, anisyl, toluyl, and xylenyl.

30. The golf ball according to claim 10 wherein the aryl is a heteroaryl.

31. The golf ball according to claim 30 wherein the heteroaryl is selected from the group consisting of pyrimidine and thiophene.

32. The golf ball according to claim 10 wherein R is a substituted aryl with one or more functional groups.

33. The golf ball according to claim 32 wherein the functional groups are selected from the group consisting of hydroxy, amino, carboxy, amide, ester, ether, halogen, siloxanyl, sulfonyl amides and nitro.

34. The golf ball according to claim 10 wherein R is a combination of alkyl, carbocyclic or aryl groups.

35. The golf ball according to claim 34 wherein the combination of alkyl, carbocyclic or aryl groups is selected from the group consisting of 1-cyclohexylpropyl, benzyl, cyclohexylmethyl, 2-cyclohexylpropyl, 2,2-methylcyclohexylpropyl, 2,2-methylphenylpropyl, and 2,2-methylphenylbutyl.

36. The method of improving the shear resistance of an unpainted polyurethane covered golf ball according to claim 12 wherein the organic compound having at least one epoxy group has the formula:

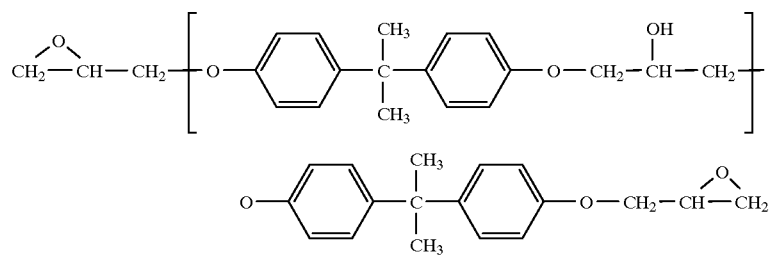
wherein n ranges from 0 to about 2.5.
* * * * *